March 18, 1969 J. F. JAMMET 3,433,681
LEAKPROOF ELECTROCHEMICAL CELL AND METHOD OF MAKING SAME
Filed May 10, 1967 Sheet 2 of 5

INVENTOR
JEAN FIRMIN JAMMET
BY
ATTORNEYS

March 18, 1969 J. F. JAMMET 3,433,681
LEAKPROOF ELECTROCHEMICAL CELL AND METHOD OF MAKING SAME
Filed May 10, 1967 Sheet 3 of 5

INVENTOR
JEAN FIRMIN JAMMET
BY Kenyon & Kenyon
ATTORNEYS

March 18, 1969 J. F. JAMMET 3,433,681
LEAKPROOF ELECTROCHEMICAL CELL AND METHOD OF MAKING SAME
Filed May 10, 1967 Sheet 4 of 5

INVENTOR
JEAN FIRMIN JAMMET
BY
ATTORNEYS

United States Patent Office 3,433,681
Patented Mar. 18, 1969

3,433,681
LEAKPROOF ELECTROCHEMICAL CELL AND METHOD OF MAKING SAME
Jean Firmin Jammet, Poitiers, France, assignor to Societe des Accumulateurs Fixes et de Traction (Societe Anonyme), Romainville, France, a French company
Filed May 10, 1967, Ser. No. 637,552
Claims priority, application France, May 18, 1966, 62,098
U.S. Cl. 136—133
Int. Cl. H01m 1/02
15 Claims

ABSTRACT OF THE DISCLOSURE

An electrochemical cell wherein a sealing cup is compressed about the bottom of the metal cup constituting the outer electrode, the inner electrode being a carbon rod with surrounding depolarizing mix contained within the outer electrode, a plastic casing with a relatively thin lateral wall having a castellated lower end turned inward over the bottom of the sealing cup without thickening and a metallic casing covering the plastic casing and also engaging the upper and lower ends of the cell, the latter metal casing confining the plastic casing and preventing its swelling under action of gases developed during use of the cell.

RELATED APPLICATION

A related application, Ser. No. 428,714, filed by applicant on Jan. 28, 1965 is now Patent No. 3,342,644.

BACKGROUND OF INVENTION

In the applicant's said copending patent application Ser. No. 428,714, a device is disclosed enabling the obtention of the tightness of a cylindrical cell in which the cup-shaped outer electrode is enclosed in an insulating plastic casing. This device comprises a sealing cup fitted by compression around the bottom of the outer metal cup usually made of zinc, and a metallic ring with an L-shaped cross-section which squeezes the plastic casing against a portion of the sealing cup, thereby ensuring the tightness of the cell.

In certain cases, for example, when the electrochemical cell must supply a relatively strong current, it may happen that the plastic casing becomes inflated by the gases produced by the cell's electrochemical process. Inflation of the plastic casing may result in troublesome consequences and can even prevent the removal of the cells from the compartment of the apparatus in which they are placed.

The present invention has for its primary object the remedying of this drawback, that is, to provide a device ensuring the tightness of an electrochemical cell while keeping the dimensions of this cell constant.

The leakproof cylindrical electrochemical cell according to the invention comprises a sealing cup set by compression around the bottom of a metal cup constituting the outer electrode, the inner electrode consisting of a carbon rod, the assembly being enclosed in a plastic casing the castellated lower end of which is turned back inward without thickening on the bottom of the sealing cup which provieds an electrical contact surface, characterized by the fact that the cylindrical portion of the plastic casing is covered by a metal casing which also engages both the upper and the lower parts of the cell.

The present invention also relates to a method for manufacturing the above-described cell.

The cell according to the invention is otherwise equivalent or similar to that described in the above-mentioned patent application, excepting for the fact that the height of the L-shaped metal ring engaging the bottom of the cell is increased so that its upper part can be bent inwards upon the upper part of the cell.

The provision of a surrounding metal casing according to the present invention prevents any possible deformation of the cell as a result of a high current output. However, the diffusion of the gases out of the cell is not suppressed, the reduction of the diffusion area through the plastic casing being compensated by the increase of the gas pressure, this increase being due to the existence of the metal casing.

Since the zinc cup electrode no longer takes any part in the sealing of the cell, it is no longer necessary to take measures for preserving the mechanical strength of the bottom of the zinc cup by preventing the said bottom from acting as an electrochemically active element.

According to the present invention a suitable separator, impregnated with electrolyte can be placed, in the bottom of the zinc cup, this bottom thus becoming an electrochemically active portion of the cell.

Furthermore, owing to the existence of the metal casing all the way along the length of the plastic casing, the zinc cup is no longer needed to strengthen the upper part of the cell; according to the present invention, it is therefore possible to eliminate the portion of the zinc cup which ordinarily extends higher than the level of the depolarizing mix in the cell.

Other objects and features of the invention will appear in the following detailed description and the accompanying drawings presented as illustrative and not limitative examples, and in which.

DETAILED DESCRIPTION

Figure 1:
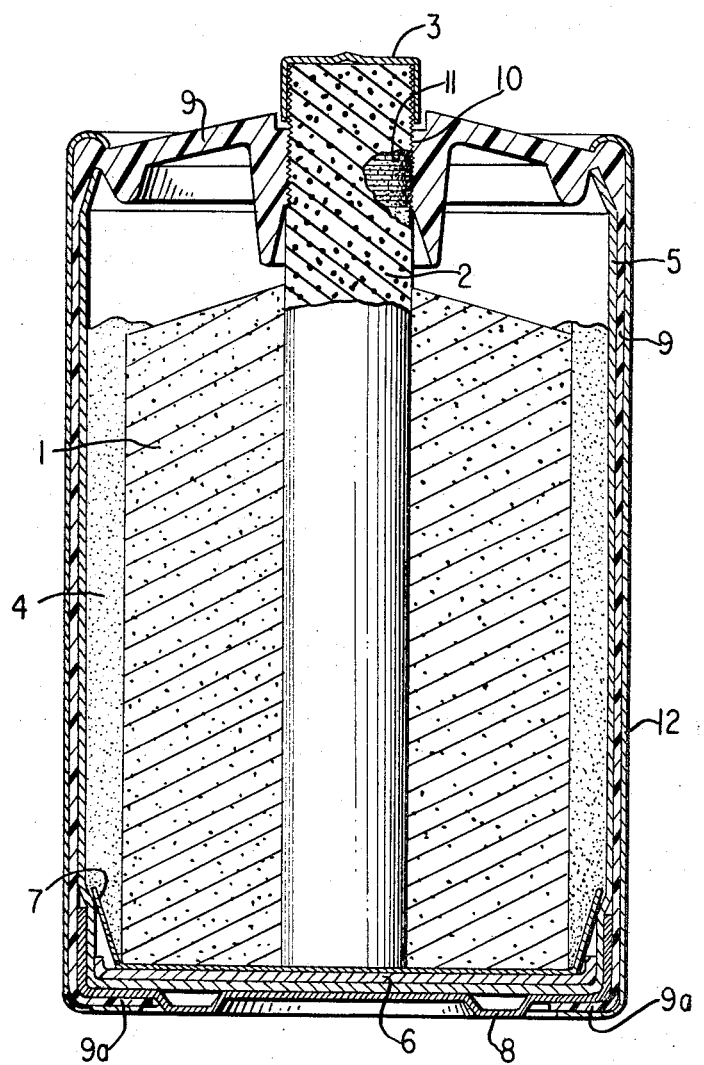
FIGURE 1 is a cross section of an electrochemical cell according to the present invention.

Referring to the drawings:

In FIGURE 1, a compressed depolarizing mix is shown at 1. This mix may comprise manganese dioxide as its main ingredient. A carbon rod 2 serving as positive electrode is surrounded by the mix 1 and has its top end covered as by a metal contact cap 3, the upper part of its lateral surface having grooves 10. An electrolyte, preferably gelified surrounds the mix 1 as shown at 4, and 5 designates a negative electrode cup made of zinc in which the polarizing mix 1, rod 2 and electrolyte are contained. A cardboard insulating disc 6 and a shallow cup 7 both made, for example, of kraft paper ensure the centering of the depolarizing mix in the electrode cup 5. A metallic sealing cup 8 is set by compression around the lower part of the electrode cup 5.

The electrode cup 5, filled with the aforementioned components of the cell, is force-fitted into a plastic casing 9 having a relatively thin lateral wall. The plastic the presence of the cap 3 which can be mounted on rod 1 either before or after application of casing 9, and of the grooves 10 which engage said casing and also ensure the tightness of the cell.

The lower part of the casing 9 is castellated and the castellations 9a are turned inwards over the bottom of the sealing cup 8. The top of the carbon rod 2 is coated, preferably after positioning of the cap 3 as by a layer of wax 11 which improves the tightness of the cell.

According to the present invention, the lateral wall of the plastic casing 9 is enclosed by a metal casing 12 made, for example, of aluminum, the upper and lower edges of the casing 12 engaging respectively the upper part and the bottom part of the cell.

Figure 2:
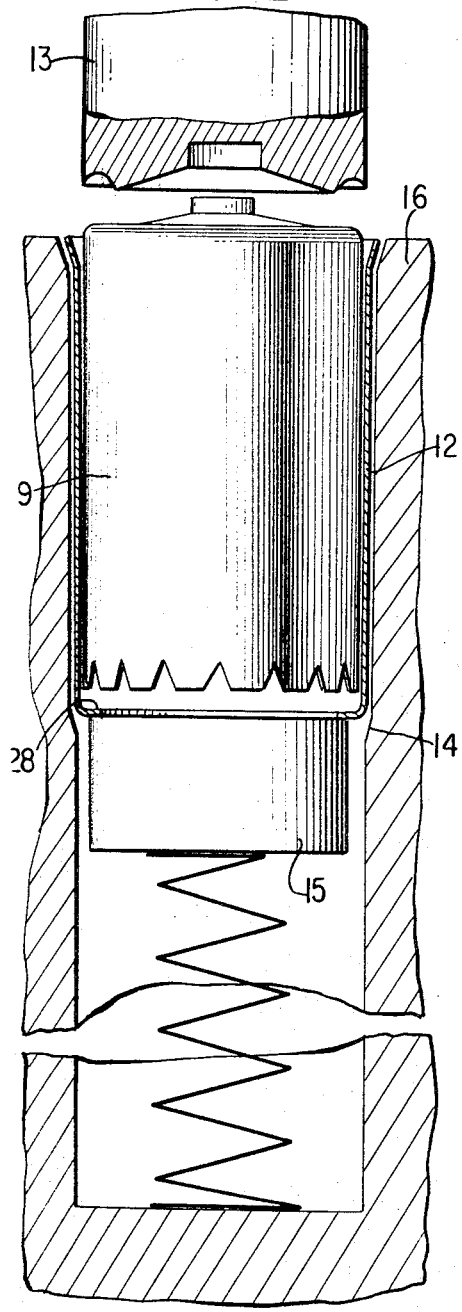
FIGURES 2, 3 and 4 illustrate schematically three successive steps in the method of manufacturing a cell according to the present invention.
Figure 3:
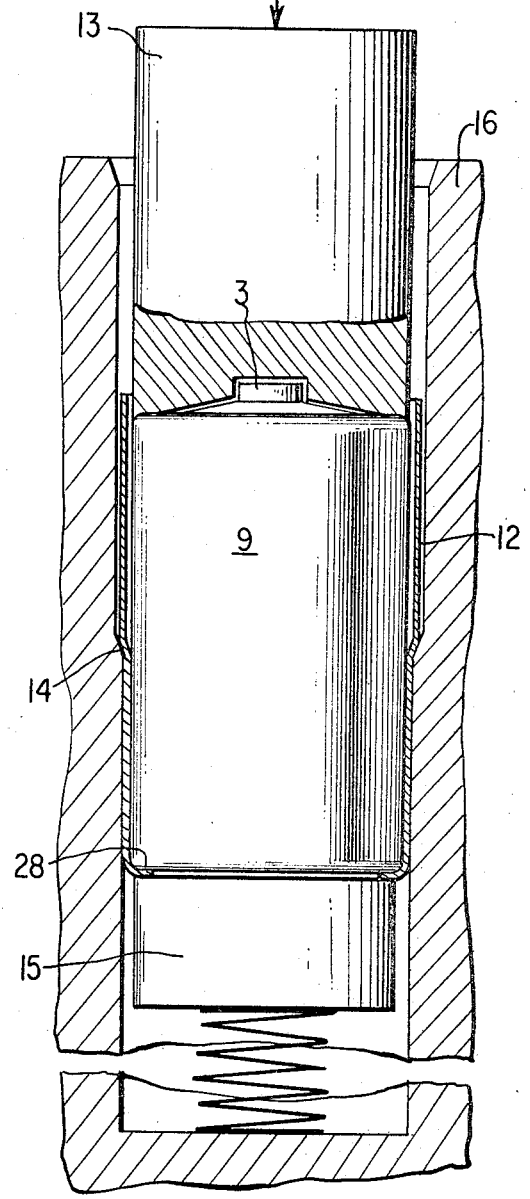
Figure 4:
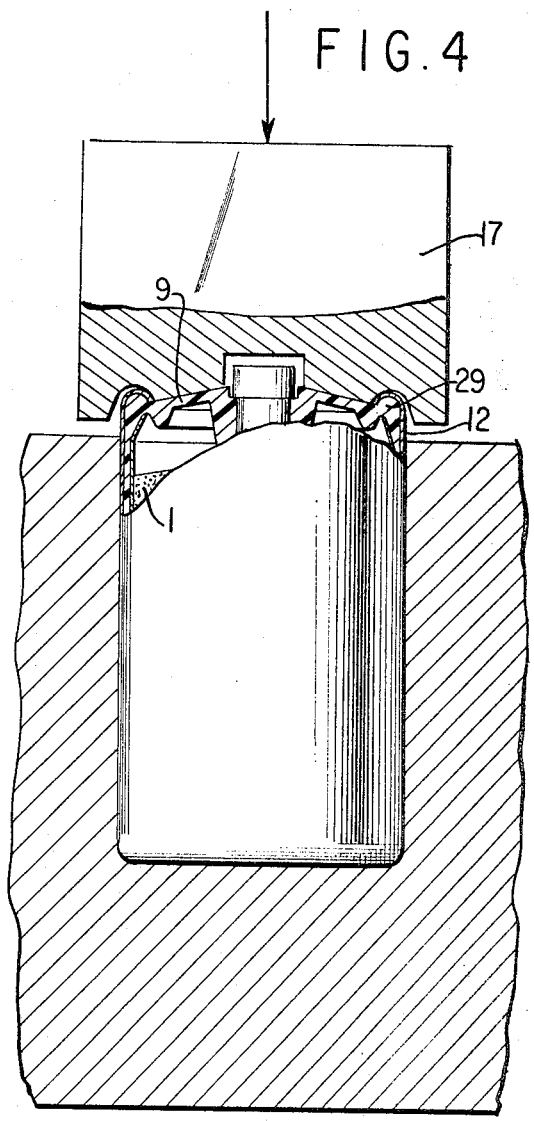

FIGURES 2, 3 and 4 illustrate schematically three successive steps of the method of manufacture of a cell according to the invention.

FIGURE 2 shows the electrochemical cell before applying the metal casing 12 onto the resilient plastic casing 9 by compression.

FIGURE 3 shows the electrochemical cell during the operation of reducing the diameter of the metallic casing 12 to fit tightly by compression onto the plastic casing.

FIGURE 4 shows the electrochemical cell while the upper part or edge of the metal casing 12 is being crimped onto the top of the plastic casing 12.

In FIGURES 2 and 3, the reference character 16 designates a barrel provided with a conical compression die 14, the reference character 13 designates a pressure piston and the reference character 15 designates a counter-pressure piston which may also be used subsequently for disengaging the completed cell from the barrel 16.

The zinc cup 5, filled with the cell components described and provided with the sealing cup 8 fitted by compression around its lower part and covered by the plastic casing 9 whose lower castellated parts 9a are not yet turned inwards, is fitted into the metal casing 12 which has a bent-in lower portion 28 and is first placed in the upper part of the pressure barrel 16.

Now downward movement of the pressure piston 13 causes the reduction of the diameter of the metal casing 12 onto the plastic casing 9 by compression through the agency of the conical die 14 in barrel 16.

During this downward movement, the counter pressure piston 15 is applied against the lower part 28 of the metal casing 12 and the lower castellated portions 9a of the casing 9 as a result are bent without overlapping between the sealing cup 8 and the portion 28.

The upper mouth edge of the casing 12 and the upper mouth edge of the barrel 16 are preferably slightly flared, as shown in FIGURES 2 and 3, in order to facilitate the insertion of the assembled cell components enclosed in the plastic casing 9 into the casing 12.

In FIGURE 4, reference character 17 designates a crimping tool which is moved into position and bends the upper part of the metal casing 12 over the upper part of the plastic casing 9 and more particularly over its upper edge 29, this being effected after the compression operation of FIGURES 2 and 3.

Figure 5:
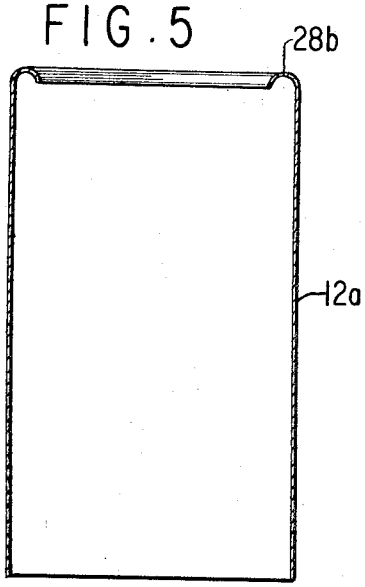
FIGURES 5 and 6 are schematic cross sections of two variants of a metal casing as they appear before being placed around the plastic casing enclosing a cell according to the present invention.

FIGURE 2 shows the metal casing 12 which has a bent lower end 28 before being compressed on the plastic casing 9; however, as shown in FIGURE 5, it is possible to use a metal casing 12a bent at its upper end 28b instead of the lower end.

Figure 6:
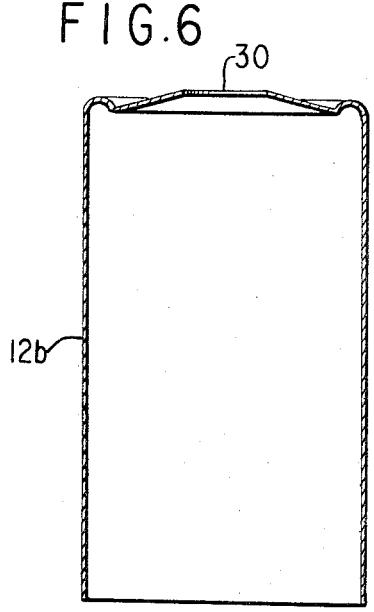

As shown in FIGURE 6, it is also possible to use a metal casing 12b having the shape of an inverted cup provided with a central aperture 30 which is large enough in diameter to let the metal cap 3 of the electrochemical cell pass through without making any electrical contact with this cap.

The main advantage of the latter type of casing 12b resides in the fact that the upper part of the plastic casing 9 is thus mechanically strengthened and can no longer be deformed by action of the gases evolved in the cell during its operation. As a result, the upper part of the plastic casing can then be thinner, which will promote the diffusion of the bases out of the cell, if the upper part of the metal casing 12b is provided with notches or perforations which leave a part of the resilient casing uncovered.

Figure 7:
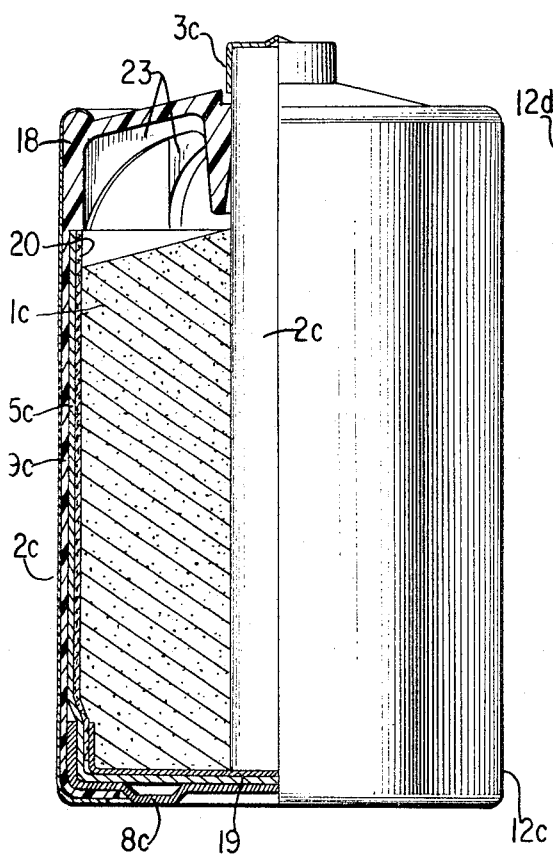
FIGURE 7 is a partial section of a further embodiment of an electrochemical cell according to the present invention.
Figure 8:
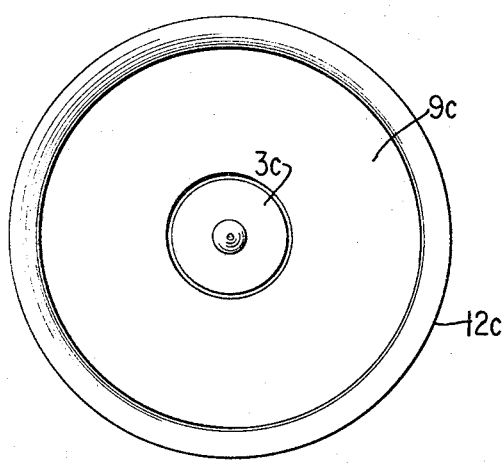
FIGURE 8 is a plan view of the embodiment of FIGURE 7 according to the present invention.

FIGURES 7 and 8 are respectively a half section and a plan view of an alternative embodiment of an electrochemical cell according to the present invention. In these figures, the corresponding elements are designated by the same reference characters with subscript c as the corresponding elements of FIGURE 1.

It will be noticed that the part of the plastic casing 9c situated above the depolarizing mix 1c includes a relatively thick portion 18 against which the upper edge of the zinc cup 5c abuts, this cup having substantially the same height as that of the depolarizing mix 1c.

An electrolyte impregnated paper 20 is placed between the mix 1c and the vertical wall of the cup 5c. A cup-like separator 19 is included at the bottom of mix 1c and cup 5c enabling the electrochemical reaction of the cell to occur also at the bottom of the cup 5c.

Inner radial ribs 23 are provided at the top of casing 12c and are intended to strengthen mechanically the upper part of the cell. These ribs extend from the portion of the plastic casing 9c against the carbon rod 2c. These ribs 23 preferably are made integral with the plastic casing 9c.

Figure 9:
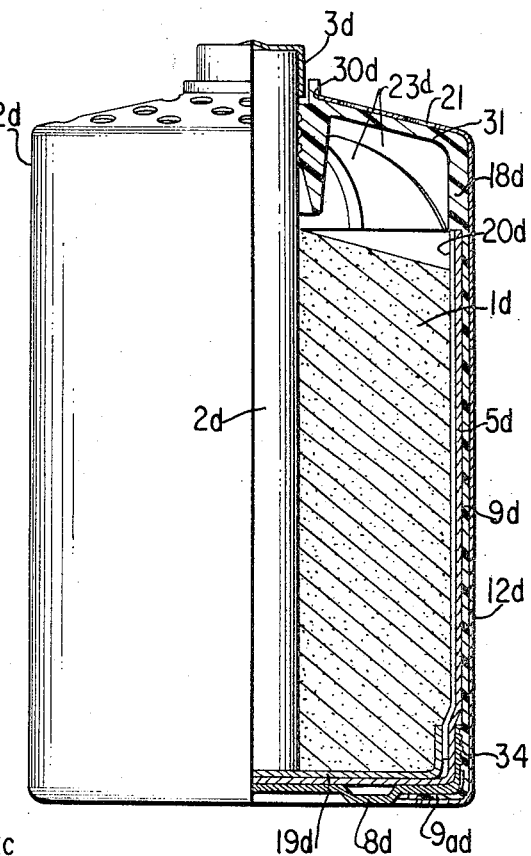
FIGURE 9 is a partial section of another embodiment of a cell according to the present invention.
Figure 10:
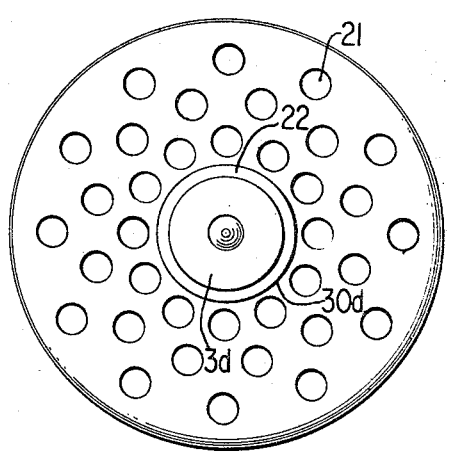
FIGURE 10 is a plan view of the cell according to FIGURE 9.
Figure 11:
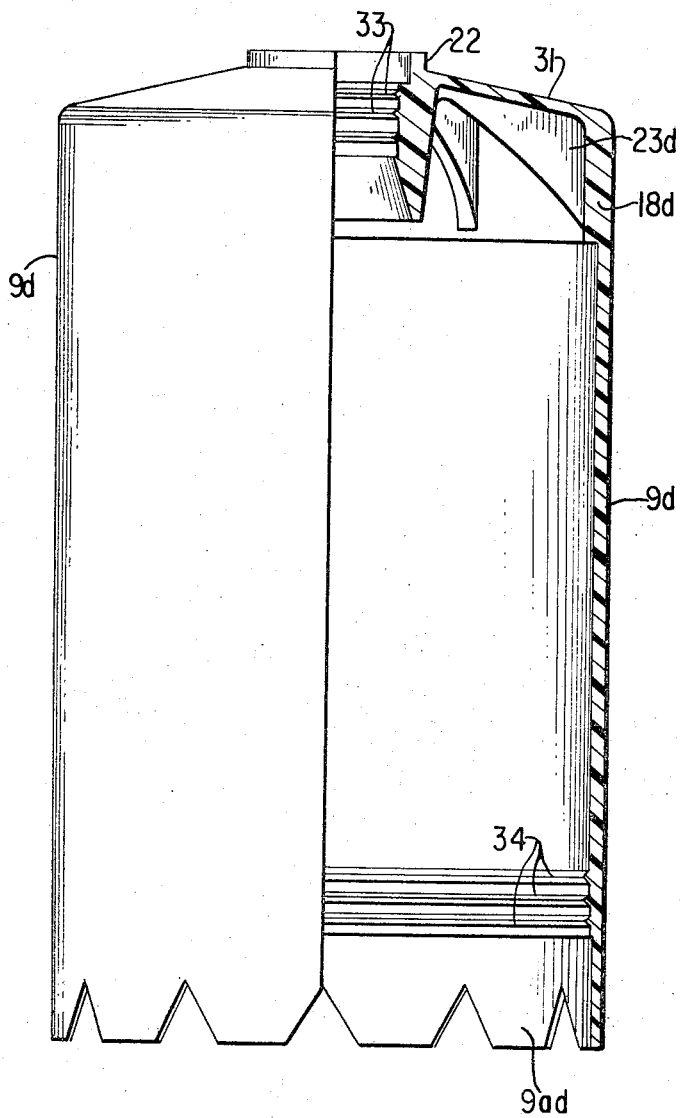
FIGURE 11 is a partial sectional view of the plastic casing enclosing a cell according to the embodiment of FIGURES 9 and 10.

FIGURES 9 and 10 show respectively a half-section and a plan view of another embodiment of the electrochemical cell according to the invention and FIGURE 11 is a half-section of the plastic casing which is used with the embodiment of FIGURES 9 and 10.

In these figures, the elements are designated by the same reference characters with subscript d if they correspond to similar elements of FIGURES 1, 7 and 8.

The metal casing 12d is in the shape of an inverted cup, the top end of which is provided with a central aperture 30d for noncontacting passage of the metal cap 3d. The upper wall of the casing 12d includes perforations 21 which leave a portion of the upper surface 31 of the plastic casing 9d visible.

It can be seen from FIGURE 11 that the plastic casing 9d also comprises an upper insulating collar 22 which is intended to prevent the metal casing 12d from contacting either the carbon rod 2d or the cap 3d. The plastic casing 9d also optionally comprises a relatively thick portion 18d providing an abutment for the zinc cup 5d; however, this thick portion can be omitted, the zinc cup 5d bearing on the lower portion of the ribs 23d, the function of which is to strengthen the upper part of the cell.

The upper wall part 31 of the plastic casing 9d is made thinner than portion 18d in order to promote the diffusion of the gases. The wall part 31 may have a thickness of about 0.4 millimeter.

The castellated lower end 9ad of the plastic casing 9d is also made thinner than the lateral side portions of the said casing, this in order to avoid thickened parts when it is bent inwardly and applied upon the bottom of the sealing cup 8d.

Lastly, the wall parts of the plastic casing 9d bearing on the carbon rod 2d and that bearing on the vertical wall of the sealing cup 8d comprise corrugations 33 and 34 improving the tightness of the cell.

While specific embodiments of the invention have been described and shown, variations within the scope of the appended claims are possible and are contemplated. There is no intention, therefore, of limitation to the exact abstract or disclosure herein presented.

What is claimed is:

1. An electrochemical cell of the type wherein a metal cup constitutes the outer electrode of the cell and containing therein an inner electrode, depolarizing mix and electrolyte and a sealing cup constricted about the closed bottom of said metal cup, a plastic casing mounted about said metal cup and having a thin lateral wall and a castellated lower end, the castellations thereof being turned inward without thickening onto the bottom of said sealing cup and a metal casing constricted about and covering the entire lateral wall of said plastic casing and having upper and lower end portions engaging respectively the upper and lower ends of said cell.

2. An electrochemical cell according to claim 1 wherein said metal casing comprises an upper end part that is oblique with respect to the axis of the cell and which has an aperture, and a contact cap mounted on said inner electrode and projecting through said aperture.

3. An electrochemical cell according to claim 2 wherein said upper end part has other openings therein.

4. An electrochemical cell according to claim 1 wherein said metal cup has a height equal substantially to that of said depolarizing mix.

5. An electrochemical cell according to claim 1, including a separator containing electrolyte disposed in the bottom of said metal cup between the latter and the lower ends of said carbon rod and depolarizing mix.

6. An electrochemical cell according to claim 1 wherein that part of said plastic casing lying above said depolarizer mix has a thickened wall portion defining a shoulder against which the upper end of said metal cup abuts.

7. An electrochemical cell according to claim 1 wherein said plastic casing has an upper part above the upper end of said metal cup and a portion bearing against said carbon rod and radial ribs integral with said casing and extending between said upper part and said portion.

8. An electrochemical cell according to claim 2, including means at the upper part of said plastic casing for preventing contact between said upper end part of said metal casing and said carbon rod and said metal cap.

9. An electrochemical cell according to claim 8 wherein said means includes a collar at said upper part of said plastic casing.

10. An electrochemical cell according to claim 1 wherein said plastic casing has an upper end wall which is substantially thinner than its lateral wall.

11. An electrochemical cell according to claim 1 wherein the castellated end of said plastic casing is substantially thinner than its lateral wall.

12. An electrochemical cell according to claim 1 wherein said plastic casing has a portion bearing against said carbon rod, said portion being corrugated.

13. An electrochemical cell according to claim 1 wherein a portion of said plastic casing bears on a vertical wall portion of said sealing cup and is corrugated.

14. An electrochemical cell according to claim 1 wherein said metal casing is of aluminum.

15. A method of manufacturing an electrochemical cell comprising as components a metal cup electrode, an inner carbon rod electrode, electrolyte, a sealing cup and a plastic casing surrounding said metal cup and having a castellated lower end, comprising assembling said components, providing a tubular metal casing, inserting said assembled components into said casing, thereafter moving said tubular metal casing through a die to constrict the dimensions of the said metal casing into compressing relationship with the lateral wall of said plastic casing and thereafter engaging an end portion of said metal casing with a corresponding end part of the cell.

References Cited

UNITED STATES PATENTS

| | | | |
|---|---|---|---|
| 2,802,042 | 8/1957 | Anthony et al. | 136—133 |
| 3,168,420 | 2/1965 | Jammet | 136—133 |

FOREIGN PATENTS 531,237  12/1940  Great Britain.

WINSTON A. DOUGLAS, *Primary Examiner.*

D. L. WALTON, *Assistant Examiner.*

U.S. Cl. X.R.

136—166

UNITED STATES PATENT OFFICE
CERTIFICATE OF CORRECTION

Patent No. 3,433,681                                                  March 18, 1969

Jean Firmin Jammet

It is certified that error appears in the above identified patent and that said Letters Patent are hereby corrected as shown below:

Column 1, line 64, "provieds" should read -- provided --. Column 2, line 72, after "plastic" insert -- casing 9, after mounting, cannot be remov because of --. Column 4, line 2, "bases" should read -- gases --.

Signed and sealed this 31st day of March 1970.

(SEAL)
Attest:

Edward M. Fletcher, Jr.
Attesting Officer

WILLIAM E. SCHUYLER, JR
Commissioner of Patents